July 13, 1926.  
C. N. FAIRCHILD  
THIRD POSITION COINCIDENTAL LOCK  
Filed Jan. 25, 1926

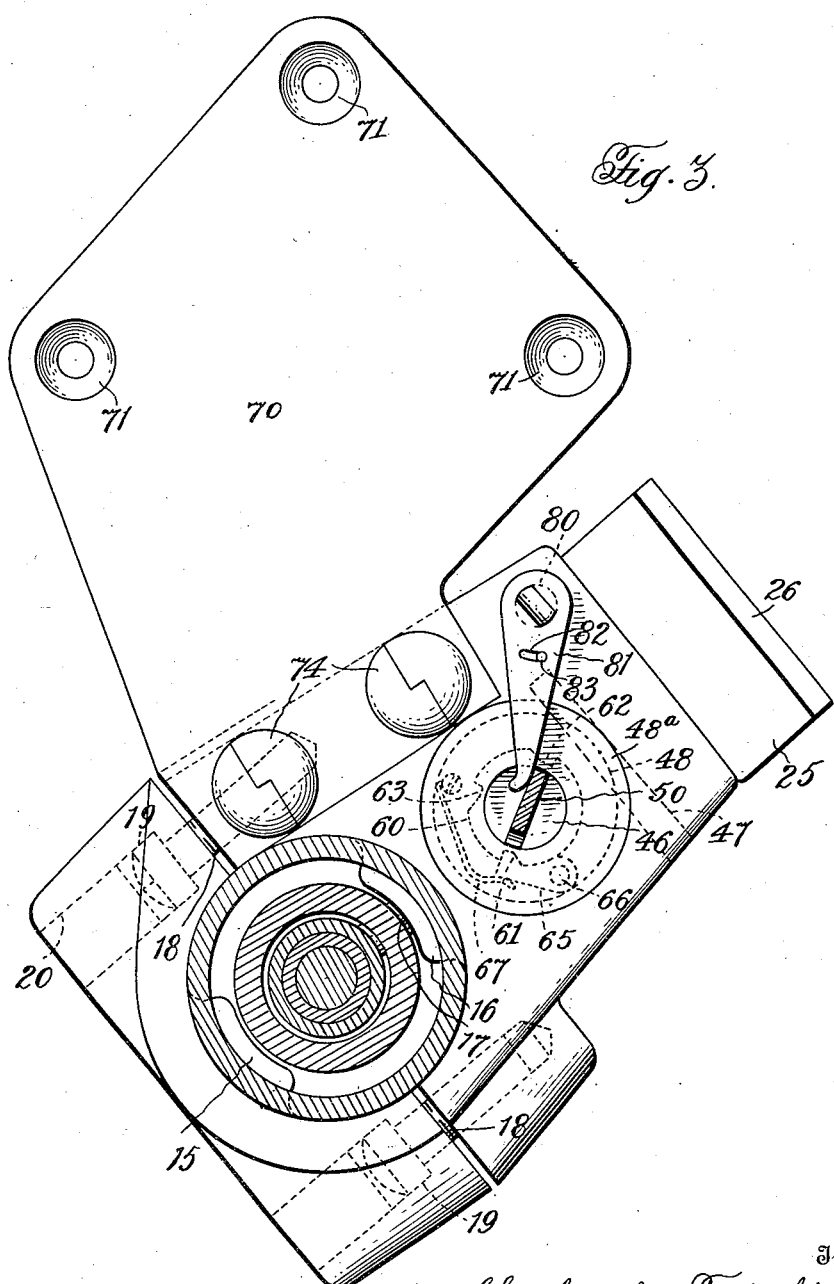

July 13, 1926.
C. N. FAIRCHILD
1,592,091
THIRD POSITION COINCIDENTAL LOCK
Filed Jan. 25, 1926   4 Sheets-Sheet 4
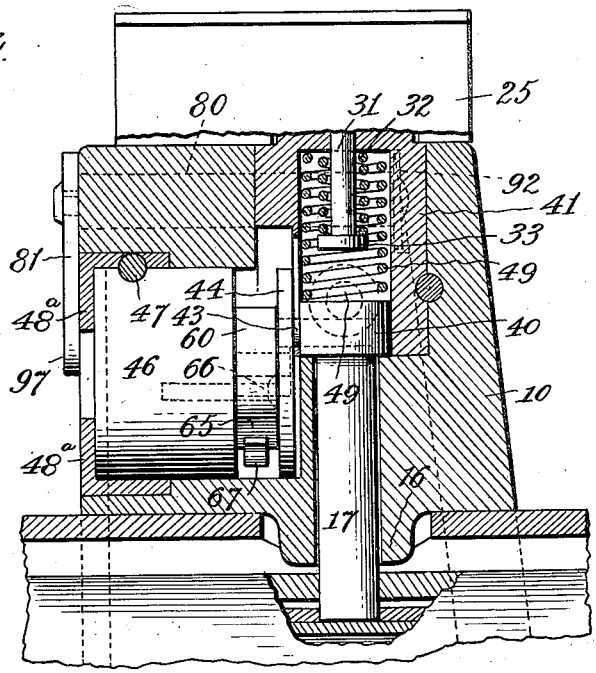
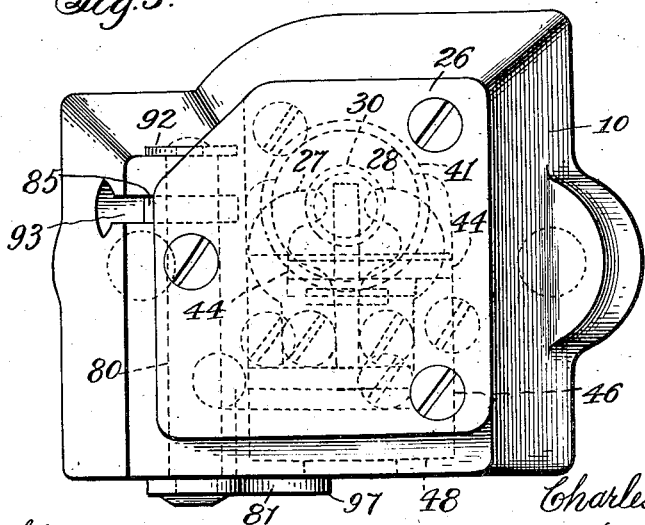
Witness:
Jas E Hutchinson
Inventors
Charles N. Fairchild,
By Henry H Snelling
Attorney.

Patented July 13, 1926.

1,592,091

UNITED STATES PATENT OFFICE.

CHARLES N. FAIRCHILD, OF MILFORD, CONNECTICUT, ASSIGNOR TO FAIRCHILD LOCK CORPORATION, OF NEW YORK, N. Y., A CORPORATION OF DELAWARE.

THIRD-POSITION COINCIDENTAL LOCK.

Application filed January 25, 1926. Serial No. 83,627.

This invention relates to automobile locks and has for its principal object the provision of a lock of the coincidental type in which the ignition circuit cannot be broken without simultaneously locking the car whether the locking member is a bolt or not and whether it locks the steering post transmission or other part of the automobile, in which a third position is provided in addition to the two usual positions, i. e., running and locked.

It frequently happens that circumstances arise in which it would be very convenient to unlock the steering post or transmission in order that the car might be moved about and yet not have the power applied to the vehicle or, in other words, without closing the ignition circuit. Such an arrangement would be particularly useful in transporting an automobile by rail or in leaving the car in a large metropolitan garage. A good many of the larger garages require that the key be left with the garage owner so that the car can be moved about from place to place should occasion arise.

An object of the present invention therefore is the provision of a coincidental lock in which the steering mechanism and the wheels may be left free without closing the ignition circuit. A still further object is the provision of such a lock as just described in which the operator after having turned the lock to this third position may not turn the lock back to locked position without first turning the lock thru the rest of its arcuate movement and in so doing unlocking the car and closing the ignition circuit.

I prefer that the key shall be removable from the lock in the third position but this is not at all essential and some manufacturers prefer that the key be removable only in ordinary parked position with the automobile locked and the ignition off.

In the drawings:—

Figure 3 is a plan view looking directly down the axis of the steering tube.

Figure 4 is a cross-section at right angles to Figure 1.

Figure 5 is a view looking down on the switch mechanism.

Figure 1:
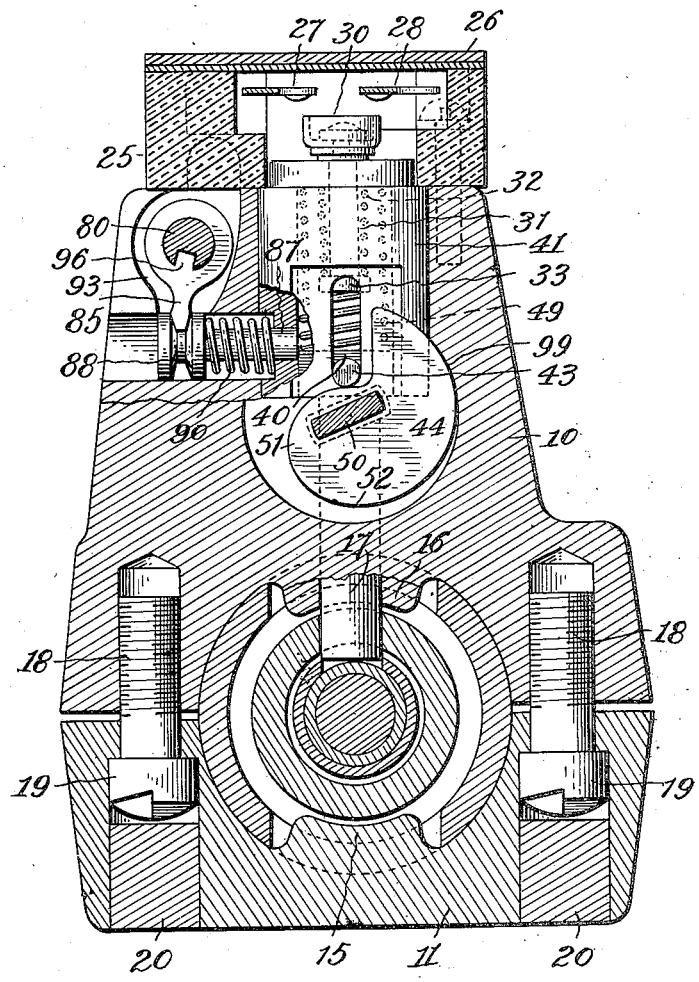
Figure 1 is a substantially central section taken to one side of the axis of the steering post locking bolt showing the parts in ordinary locked position.
Figure 2:
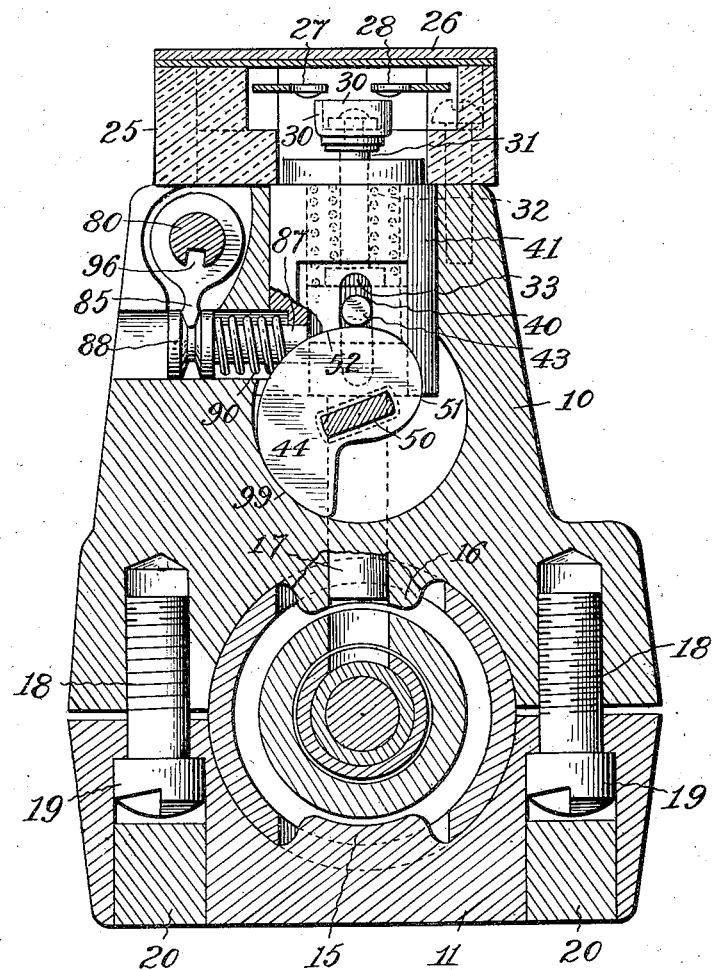
Figure 2 is a similar view but showing the parts in what I have termed the third position, the key in this instance having been turned 180° from the position shown in Figure 1.

For convenience of description in the following specification the word "top" will be used to denote that portion of the device at which the switch box is located. As a matter of actual fact, as installed on the automobile, the device is arranged at an angle to both horizontal and vertical since the steering post casing and the cowl are each slanted, so that in strict accuracy the top of the lock housing is the edge of the device formed by the meeting of the front face through which the key is inserted, and the switch box attaching face.

The device in general consists of a housing 10 having a housing cap 11 each having a semi-cylindrical recess therein matching to form a complete cylindrical bore receiving the steering post casing. Each of the members, 10 and 11, is provided with non-alining bosses, that of the housing cap being solid and usually an anvil 15 while the boss 16 of the main housing has a central cylindrical opening therein through which slides the steering post locking bolt 17. The cap 11 is secured to the housing 10 in any desired manner preferably by means of two one-way screws 18, the heads 19 of which seat about half way of the bores in the cap after the screws are driven home, and the remainder of these bores are then filled by plugs 20 driven in with a forced fit and finally smoothed flush to the outside of the cap.

The switch box is preferably a block of bakelite, fiber, or similar material 25 and conveniently having a brass lid 26. In this switch box are located two resilient, arcuate contact pieces 27 and 28 spaced apart a convenient distance and which when electrically connected close the ignition circuit. The wires leading to the switch box and connected to the contacts 27 and 28 preferably enter from the rear, that is behind the cowl board. The contact closing element may be of any form desired as may the contacts themselves but the parts are here shown in a form that has been found very satisfactory in practice, the closing element being a metal cup 30 carried by and insulated from the stem 31 which is urged downwardly into open circuit position by a spring 32 confined between the bottom face of the switch box and a collar 33 on the stem 31.

The locking bolt 17 has an enlarged circular head 40 freely slidable in its bore in the plug 41 but is not free to rotate since the head 40 carries a pin 43 projecting through a slot in the plug 41 so as to lie in the path of the bolt raising cam 44 fast upon the inner or rear end of the cylinder of the spring-pressed plunger type lock, the barrel of which is denoted 46 in the drawings.

The lock, or more properly speaking the barrel 46 of the lock, is held in place in a tightly fitting bore of the housing by means of a drive pin 47 which may, if desired, be slightly tapered and which, when once driven in, cannot be removed. The slightly larger counterbore of the lock barrel receiving bore in the housing is closed by a cylindrical cap 48 also held in place by the pin 47. A spring 49 engages the head 40 of the locking bolt 17 and constantly tends to shoot the bolt into locking position.

Proper movement of the cylinder of the lock by means of its key 50 turns the cam 44 so that the lug or pin 43 on the head 40 rides up the spiral arc or curve 51 to the point 52 at which time the spring 49 is compressed, the bolt 17 entirely withdrawn from locking engagement, and contact is made between the head 40 of the locking bolt and the stem 31, but the latter is not lifted to close the ignition circuit.

A novel and important feature of the present invention is the provision of the ratchet disk 60 which is fixed with respect to the cam 44 and the cylinder of the lock. This ratchet disk 60 carries a plurality of indentations such as 61, 62, and 63 which are engaged by a pawl 65 pivoted as at 66 to the barrel 46 of the lock and held against the ratchet 60 or in one of the indentations if they are in registry, by means of a leaf spring 67 preferably also secured to the barrel of the lock although obviously since this is fixed with respect to the housing the spring 67 and/or the pawl may be secured to the housing.

The usual clamp or bracket for the steering post tube may conveniently be eliminated when using a lock of this type by providing a cowl bracket 70 secured to the cowl itself as in the standard form of bracket by fastenings passing through the recesses 71 in the plate secured to the housing 10 by recessing the housing the amount of the thickness of the plate 70 and by securing together the plate and housing by means of one-way screws 74 which preferably are given a coating of a freshly mixed putty consisting of litharge and glycerine just before they are inserted. Obviously the plate and housing may be secured together in other manners but the one described is the one preferred and is highly satisfactory.

In the upper left hand corner of the housing I provide a rock shaft 80 to one end of which is secured a lever 81 slotted as at 82 to receive a stop 83 limiting the angular movement of the lever 81 and consequently of the shaft 80 to which it is attached. Keyed upon the shaft 80 is a one-toothed pinion 85 meshing with a plunger 87 having an enlarged head which may be considered a one-toothed rack 88. The plunger and its head are each cylindrical and fit somewhat snugly in a bore in the housing so located that the tip of the plunger 87 may enter the path of the head of the locking bolt 17; a spring 90, however, resisting such movement, and tending to throw the plunger 87 out of its bore, which tendency in turn is resisted by the lever 81 which like the one-toothed pinion 85 is non-rotatable on the shaft 80.

Some means is necessary to prevent withdrawal forwardly of the shaft 80. One method of doing this would be to pin the pinion 85 to the shaft but such a construction would render more difficult the assembly of the lock and I therefore prefer to carry the shaft 80 entirely through the housing and to head the shaft at the rear or more simply, as illustrated, to head a washer on the shaft, such for example, as shown at 92 which will permit very convenient and simple assembly by first securing together the lever 81 and the shaft 80, dropping the pinion 85 into its slot 93 so as to engage the rack, then pushing the shaft 80 thru the bore in such fashion that the key groove on the shaft will receive the key projection 96 on the pawl or pinion and the washer can finally be headed against the rear end of the shaft. Obviously during the process of assembling, the plunger 87 must be held inward compressing its spring 90.

The operation of the parts is relatively simple. We will assume that the driver desires to use the car which is standing locked and with ignition off. He places the key 50 in the slot of the cylinder and turns it in the only direction possible, that is, clockwise; counter-clockwise movement not being possible because the edge of the key engages the obtuse angle 97 on the lever 81 and the stop 83 prevents any movement of the lever in a clockwise direction. the spring 90 surrounding the plunger 87 yieldingly holding the lever against its stop. Upon turning the key in a clockwise direction a resistance is felt as the pawl is withdrawn from the ratchet, and a little later a slight resistance is encountered as the cam picks up the pin of the locking bolt and compresses the main spring. At somewhat less than 180° the locking bolt is entirely withdrawn and at 270° the ignition is turned on.

When the driver has turned the key in the lock through the full half turn or 180°, the pawl 65 engages the depression 61 in the ratchet wheel and positively prevents reverse movement of the key. The car may now remain unlocked and ignition off until the key is turned through a further 90°. The driver may remove the key at 180° but cannot possibly revolve the key back owing to the locking engagement of the pawl and ratchet. In the usual running position, i. e., 270° the key cannot be withdrawn.

When the key is turned thru the first 180° the pin 43 rides up the curve 51 of the cam to the point 52 which is preferably in the middle of a true arc. At the 180° point which is the third position, the pawl 65 locks the ratchet wheel against reverse movement and holds the parts in that place if it is desired to use the third position. If not, the driver simply does not stop the key at 180° but turns directly to 270°, the curve of the cam rising gently from 180° to 270° so that at the latter point the contact 30 has been brought into engagement with the contacts 27 and 28.

In turning the key thru the last 90° the pin on the head of the pawl rides on a circular arc 99 of the cam. Just before the key goes to the 360° point i. e., with the cylinder tumblers in registry so the key can be withdrawn, the edge of the key engages the lever 81 from the left moving the lever against the stop 83 so that further turning of the key in a clockwise direction is prevented by the locking engagement of the lever 81, and counter-clockwise movement is prevented by the engagement of the pawl 65 with the recess 62. Hence the driver must either leave the parts exactly as they are i. e., unlocked and with closed ignition, or must remove the key from the lock.

If he removes the key from the lock the lever 81 now free moves over against the stop 83 to the other limit of its travel; the spring 90 withdraws the plunger 87; this frees the locking bolt 17; and movement of the head under urge of the spring 49 immediately opens the ignition circuit by the movement of the cup 30 by its spring 32.

In ordinary driving position the key is only turned on 270°. There is a decided resistance at this point due to the pawl engaging the ratchet so that the driver cannot possibly mistake the position and the key should always be in approximately this position in driving, that is turned only slightly beyond the three-quarter point. Beyond the 270° position the key is held by the pawl against reverse movement and the parts are in running position. Then when the driver wishes to leave the car, since he can only turn the key one direction, he makes the other quarted turn until the key is blocked from all movement as described, but even here the parts are still in running position, and he must remove the key from the lock before he can either lock his car or shut off his ignition and these he must do simultaneously, withdrawing the key from the lock and allowing the lever 81 to return to spring-pressed position.

While I have stated the principal needs for the third position there are two additional advantages which are obtained by providing a coincidental lock with a third position, namely, it enables a driver to shut off the ignition while leaving the steering in his own hands. It might not be thought that any driver could be so dumb as to lock a coincidental lock in order to coast down a hill but such nevertheless is the case and the provision of the third position will enable such a driver to coast without danger. To do so the driver turns the key from his running position of 270° to 360°, takes the key out, puts it back in, turns it 180° and leaves it there. Then when he wishes the power he turns it thru the next 90° to running position. Since the ratchet has at least three positions there is no possibility of any kind of turning the key from third or coasting position back to first position or of turning the key from running position to coasting position nor from turning it from 360° back to 270° without first taking the key out of the lock.

What I claim is:

1. In a coincidental lock, a locking member, an ignition circuit make and break mechanism, means for moving the locking member from locking position prior to the closing of the ignition circuit, and means for preventing the return of the locking member to locked position without first closing the ignition circuit.

2. In a coincidental lock, a locking member, an ignition circuit make and break mechanism, means for moving the member to locked position and for moving the make and break mechanism to "off" position, means for moving the locking member from locking position without moving the make and break mechanism to "on" position, and means for holding the locking member and the make and break mechanism in that position.

3. In a coincidental lock, a locking member, an ignition circuit make and break mechanism, means for moving the locking member to locked position and for moving the make and break mechanism to "off" position, means for moving the locking member from locking position without moving the make and break mechanism to "on" position, and further means for preventing the last named means from returning said locking member to locked position without first closing the ignition circuit.

4. In a coincidental lock, a locking member, an ignition circuit make and break mechanism, a key operated means for moving said member from locking position, and for moving the mechanism to circuit closing position said key being removable from its lock in a plurality of positions, in one of which positions the member is in unlocked position but the ignition is open.

5. In a coincidental lock, a steering post locking bolt, a make and break mechanism for the ignition circuit, means for moving the bolt to locking position and the mechanism to "off" position to open the ignition circuit, and for later moving the bolt to unlocked position without closing the ignition circuit.

6. In a coincidental lock, a locking member, an ignition circuit make and break mechanism, means for moving said locking member to locking position, rotary means for moving said locking member to unlocked position without closing the ignition circuit, means for closing the ignition circuit upon further movement of the rotary means, and means for preventing reverse movement of the rotary means, whereby after the locking member is once moved to unlocking position it must be moved further to circuit closing position before the locking member may be again moved to locked position.

7. The device of claim 6 in which the rotary means is key operated.

8. The device of claim 6 in which the rotary means is a key operated tumbler lock.

9. The device of claim 6 in which the rotary means is a key operated tumbler lock having a cam thereon which holds the locking member out of locked position thru a considerable angular movement before the ignition circuit is closed.

10. The device of claim 6 in which the locking member is a steering post locking bolt.

11. In combination a locking bolt, an electric circuit including a make and break mechanism, means for withdrawing said bolt and for closing said circuit, and means for holding said means in three positions, the first with the bolt in locking position with the circuit open, the second with the bolt withdrawn and the circuit open and the third with the bolt withdrawn and the circuit closed.

12. The device of claim 11 in which the last named means is non-reversible, whereby the bolt withdrawing means cannot be moved from second position to first position without first moving to third position.

In testimony whereof I affix my signature.

CHARLES N. FAIRCHILD.